United States Patent [19]
Varenchuk et al.

[11] Patent Number: 4,994,645
[45] Date of Patent: Feb. 19, 1991

[54] APPARATUS FOR OVERHEAD SUBMERGED-ARC WELDING

[76] Inventors: Pavel A. Varenchuk, ulitsa Prazhskaya, 3, kv. 426; Valentin D. Kovalev, ulitsa Malo-Kitaevskaya 58, kv. 2; Mikhail M. Ivanenko, prospekt Vatutina, 8, kv. 127; Nikolai T. Privalov, ulitsa Prazhskaya, 3, kv. 118; Vladimir I. Galinich, ulitsa Krasnoarmeiskaya 145, korpus 4, kv. 148; Anatoly V. Zalevsky, ulitsa Geroev Stalingrada, 48, kv. 64; Georgy L. Atamanchuk, ulitsa Zatonskogo 27a, kv. 47, all of, Kiev, U.S.S.R.

[21] Appl. No.: 460,927

[22] PCT Filed: Dec. 14, 1988

[86] PCT No.: PCT/SU88/00260

§ 371 Date: Feb. 6, 1990

§ 102(e) Date: Feb. 6, 1990

[87] PCT Pub. No.: WO89/11943

PCT Pub. Date: Dec. 14, 1989

[30] Foreign Application Priority Data

Jun. 6, 1988 [SU] U.S.S.R. .............................. 4429059

[51] Int. Cl.[5] ................................................ B23K 9/18
[52] U.S. Cl. .................................................... 219/73.2
[58] Field of Search ................................. 219/73, 73.2

[56] References Cited

FOREIGN PATENT DOCUMENTS

| | | | |
|---|---|---|---|
| 3430349 | 2/1986 | Fed. Rep. of Germany . | |
| 3430371 | 2/1986 | Fed. Rep. of Germany . | |
| 55-94781 | 7/1980 | Japan | 219/73.2 |
| 1397218 | 5/1988 | U.S.S.R. . | |
| 1397219 | 5/1988 | U.S.S.R. . | |

*Primary Examiner*—Clifford C. Shaw
*Attorney, Agent, or Firm*—Lilling and Lilling

[57] ABSTRACT

An apparatus for overhead submerged arc welding having a pivotally mounted hopper containing flux and accommodating a bowl which has its open part facing towards a work being welded and communicating with a driven auger feeder for supplying and pressing the flux in the bowl and having a controlled drive. A welding nozzle extends through the bowl, and a former is provided above the brim of the open part of the bowl. A flux backing thickness pickup is connected to the controlled drive of the driven auger feeder for varying the number of revolutions of an auger of the driven auger feeder during a preset time period. The flux backing thickness pickup is mounted on a front edge of the bowl in the welding direction, adjacent to the longitudinal axis thereof, and is in the form of any eddy current transducer. By controlling the driven auger feeder, the apparatus monitors and keeps constant the preset flux backing thickness so as to supply a constant amount of flux to the bowl.

The invention is preferably used for welding long longitudinal and rotatable annular joints.

2 Claims, 1 Drawing Sheet

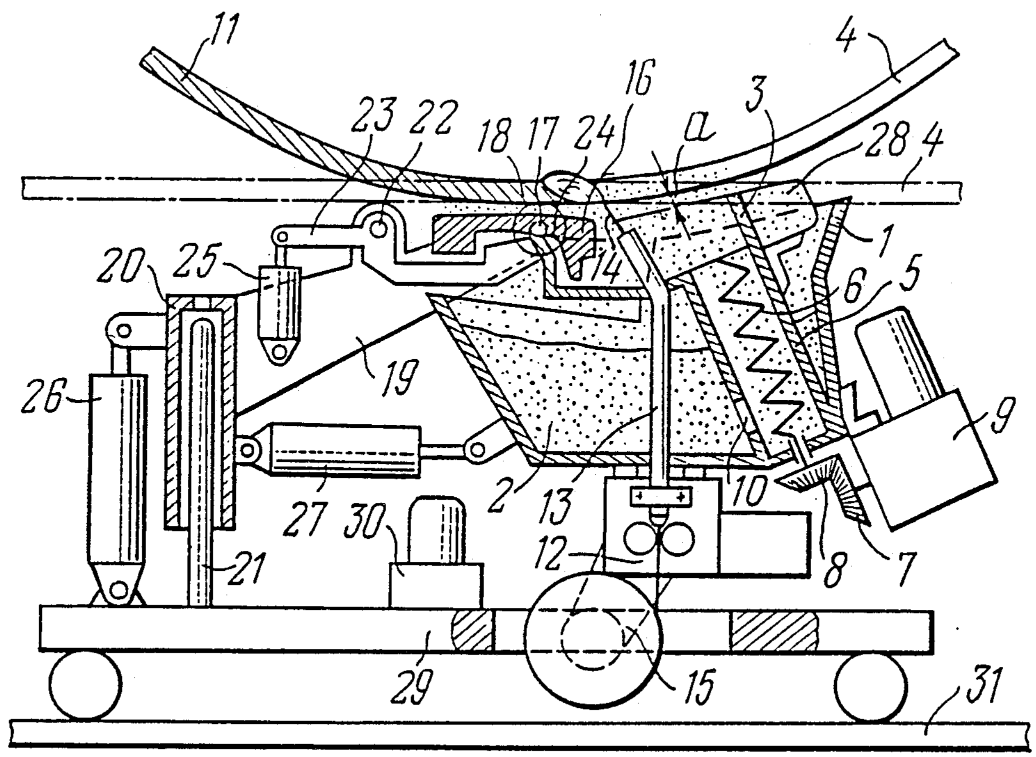
11
4
16
23
22
18
17
24
a
3
28
4
20
25
14
1
6
5
26
19
9
27
2
13
10
8
7
30
12
21
29
15
31

APPARATUS FOR OVERHEAD SUBMERGED-ARC WELDING

BACKGROUND OF THE INVENTION

1. Field of the Invention

The invention relates to equipment for arc welding, and more specifically, it deals with an apparatus for overhead submerged-arc welding.

2. Description of the Related Art

A large number of operations are performed in the manufacture of welded structures with welding of rotatable annular welds of hollow products with a restricted access to joints being welded from the interior. Such joints include annular joints of closed vessels, annular joints of pipelines, tanks, casings, assembly welds, shell plating seams of ship hulls, and longitudinal welds of large-area products which it is difficult to place to a position facilitating welding. Such joints also include joints between difficult-to-position webs, segments, three dimensional and planar sections and other members.

The overhead submerged-arc welding method is characterized by the fact that a consumable electrode and welding bath are turned at 180° in comparison with the downhand submerged-arc welding. Flux and electrode are supplied from bottom up, i.e. as though towards a ceiling. The electrode is supplied through compacted flux.

This is why this welding method will be referred to hereinbelow as overhead submerged-arc welding.

This welding method is referred to as the overhead submerged-arc welding also because arc is in the body of metal.

So called overhead welds are produced as a result of such welding.

Overhead welds and sealing overhead welds. There may also be one-pass overhead welds and other overhead welds.

The penetration overhead welds are the welds which are first to be produced in welding a joint and which are located in the top part of sections being welded, on the opposite side of the joint with respect to the electrode supply. Further welding of the joint, i.e. producing further welds, can be carried out by any appropriate knowns method, the electrode being supplied on the same side as was the case in producing the penetration overhead weld, e.g. producing inner penetration welds of rotatable annular joints of vessels, tanks, joints between bottom sections of shell plating of ships, and other structures.

The overhead submerged-arc welding of penetration welds mainly allows welding inside vessels in producing rotatable annular welds to be eliminated, and welding can also be avoided in confined spaces in producing straight welds of structures with an access on the side opposite to the ceiling.

The sealing overhead welds are the welds which are first to be produced in welding a joint and which are located in the bottom part of sections being welded on the joint side in the vicinity to the electrode supply. Further welding is carried out by any appropriate known method, the electrode being supplied on the opposite side of the joint as compared with the overhead welding.

In practice, the penetration overhead welds are produced in welding annular and longitudinal joints of structures with a restricted access to joints being welded from the interior.

The sealing welds are produced in welding elongated longitudinal joints of difficult-to-position products such as plate structures made out of segments and other members.

The one-pass overhead welds are the welds produced in welding joints of a limited thickness located over the whole welded section. No further welding of the joint on either side is required.

Many problems arise in producing sealing and one-pass welds in forming the surface of the finished weld.

The metal in the welding bath formed during arcing by fusion of the metal being welded, electrode material and welding flux is held by the crust of partly melted flux and by forming means. Forming means may be of various configuration and size and may be, e.g. in the form of plates, backings, bars, sliders and other members.

Flux is positively pressed against the welding spot from bottom, and as flux is consumed, its stock is continually replenished. Flux may be supplied for forming the top part of the weld either on the bottom side through the gap between the edges of welded members or from top by any appropriate known method so as to form a filled flux layer. Special forming backings or flux holders may also be used.

Special problems arise in welding joints of large-size cylindrical or like products such as ship hulls and boiler units where especially high quality of welds is required and where the product should be rotated about its axis during welding, and also in welding large-size planar members which it is difficult to place to a position facilitating welding.

Known in the art is an apparatus for overhead submerged-arc welding (SU, A, 1348111), comprising a hopper containing flux pivotally mounted on a pivot pin and accommodating a bowl having its open part facing towards a work being welded. The bowl communicates with a flux supply pipe having inlet and outlet ports, and an auger provided in the pipe and having a drive for supply flux to the bowl and pressing it against the work. A welding nozzle for supplying a consumable electrode extends through the bowl. The apparatus has a pair of copying wheels, one wheel being provided on the front part of the hopper in the welding direction and the other being aligned with a forming means. The hoper supports a welding head. The hopper is mounted on a pivot pin. The same pivot pin supports the other copying wheel and the forming means.

The apparatus is provided with means for turning the hopper about its pivot pin and a means for pressing the second copying wheel and forming means against the work being welded.

The forming means is provided in the vicinity to the nozzle to be extend above the brim of the open part of the bowl.

The pivot pin supporting the hopper, forming means and second copying wheel is mounted on a mounting arm provided on a carriage having means for pressing the forming means with the copying member against the work being welded, which comprises a power actuator for moving the carriage towards the work being welded.

The prior art apparatus is so constructed as to allow both absolute values of flux pressure in the bowl and force with which the forming means is pressed against the work being welded and the ratio between them to be varied.

This apparatus allows high-quality overhead submerged arc welding to be carried out with the desired forming of weld on either side in a broad range of process capabilities and with various types of products being welded.

However, as the forming means and the second copying wheel in this apparatus are mounted on one and the same pivot pin, the forming means is pressed away from the work in case of a substantial convexity of the joint being welded on the underside of the work. This results in a substantial change in position of an axis of oscillations of the hopper and copying wheel with respect to the surface of the work being welded. This change in position of the axis of oscillations of the hopper results in material fluctuations of preset pressures of flux in the bowl and at different points where welding bath is formed (upstream the arc, in the arc zone and in the welding bath zone and at the point of solidification of the welding bath), and in a disruption of welding as a whole, impairing quality of the welded joint.

In cases of a substantial concavity of the joint being welded on the underside of the work, the forming means is separated therefrom so that a substantial surplus space is formed between the working face of the forming means and the work to disrupt welding.

In addition, in welding products with geometry and assembly errors of joints, the clearance between the bowl and work fluctuates in the zone between the two copying wheels which are in contact with the work so as to result in a change in flux volume between the bowl and work thus causing fluctuations of flux pressure in the bowl and impaired welding quality as a whole.

Also known in the art is an apparatus for overhead submerged-arc welding (DE,C, 3430394), comprising a suspended pivotally mounted hopper containing flux and accommodating a bowl having its open part facing towards a work being welded and communicating with a flux supply pipe having inlet and outlet ports and an auger provided in the pipe having a drive for supplying flux to the bowl and pressing it against the work. The pipe, auger and drive for supplying flux to the bowl and pressing it against the work form a driven auger feeder. A welding nozzle for supplying a consumable electrode extends through the bowl. A copying member is provided adjacent to the welding zone and is engageable with the work surface during welding. A forming means provided adjacent to the welding nozzle above the brim of the open part of the bowl is mounted on a suspension for oscillations in its own longitudinal and transverse planes. The hopper is pivotally mounted on a mounting arm for rotation about its pivot pin.

The pivot pin supporting the hopper is mounted on the mounting arm which is movable in the direction towards the work being welded.

The same mounting arm supports the forming means and the copying member mounted on pivot pins.

The support pivot pin of the forming means is in the form of a point-like abutment at the end of an arm of a double-arm suspension lever of the forming means. The fulcrum of the double-arm lever is mounted on a mounting arm, the other arm of the lever being connected to a power actuator pivotally attached to the mounting arm. The copying member is in the form of a copying wheel and is mounted on the pivot pin supporting the hopper.

In another embodiment of this apparatus, the pivot pin supporting the forming means comprises a point like abutment at the end of a mounting arm located adjacent to the welding nozzle.

In this embodiment of the apparatus the copying member is in the form of projections on the face of the forming means, the pivot pin supporting the hopper is located on the side of the forming means remote from the nozzle, and the hopper is provided with a means for moving it with respect to its support pivot pin.

In this apparatus the mounting arm is mounted on a carriage which is mounted together with its drive on a driven trolley for moving the whole apparatus in the welding direction.

This apparatus allows permanent contact between the forming means and copying member and the work being welded to be ensured during welding with various assembly errors and deviations from geometry of the joint being welded (e.g., misalignment of plates edges, convexities and concavities, undulations, clearances, and the like).

Therefore, upon any change in position of the forming means during welding caused by an admissible change in profile of the surface of the work being welded at a point of their contact, the eventual action of the forming means upon position of the hopper containing flux is eliminated.

This facility makes it possible to prevent undesirable oscillations of the hopper upon changes in profile of the surface of the work and to stabilize such welding parameters as thickness of a flux backing and flux pressure in the welding zone.

The flux backing is an area of compacted compressed flux layer which has a preset pressure distributed over the whole area of the flux backing and which is located between the top part of the bowl facing towards the work being welded and the surface of the work being welded to exert a local pressure upon the surface of the joint being welded in the welding zone.

This construction of the apparatus provides conditions for a smooth copying of the surface of the joint being welded by the forming means without jerks and shakes which is necessary for maintaining stable preset values of flux pressure acting upon the welding bath and upon zones in which the welding bath is formed along the joint being welded.

The construction of the prior art apparatus also provides conditions for a smooth copying surface of the joint being welded by the forming means and for adjusting position of the hopper with respect to the work being welded which is necessary for carrying out welding of products of different geometry.

In this apparatus, a change in position of the forming means during welding which occurs because of errors of geometry and assembly of the joint being welded does not cause a change in position of the pivot pin supporting the hopper with respect to the surface of the work being welded.

In welding with such an apparatus, owing to the creation and maintenance at a constant level of preset flux pressures at various points along the joint being welded (upstream the arc, in the zone of the arc and welding bath and in the zone downstream the welding bath and up to the formed weld), the possibility of automatic conduct of welding of overhead welds and production of high-quality welded joints is ensured.

This apparatus makes it possible to carry out welding with a desired formation of weld reinforcement on either side of the weld over a broad range of process capabilities with a wide range of welded products and with large errors of assembly of joints before welding (misalignment of plates edges, undulations, convexities and concavities, taper of bottom in welding annular joints, e.g. in boilers and railway tanks, and the like welded structures).

Investigations showed that the flux backing thickness (the space between the surface of the outlet port of the bowl and the surface of the joint being welded filled flux) should be kept constant during automatic overhead submerged-arc welding during the entire welding period. This is required to provide conditions during welding for the maintenance of constant preset flux pressures at various points along the joint being welded (upstream the arc, in the zone of arc and welding bath and in the zone of solidification of the weld) and for retaining the welding bath at the level of the joint being welded.

In the above described apparatus, flux which is supplied during welding by means of a non-controlled driven auger feeder moves along a close-loop circuit: supply of preset amount of flux through the supply pipe with an auger from the hopper to the bowl and spillage back of unfused flux that did not participate in welding from the bowl with subsequent supply thereof during the next cycle.

Flux is comminuted (flux grading composition changes) after each cycle of its movement so as to result in compaction of flux as shown by investigations, hence, in a lower throughput capacity of the auger feeder (reduction of the amount of flux supplied by the auger to the bowl per unit of time), hence, in a decrease in the flux backing thickness.

However, in welding elongated joints at a constant speed, i.e. in applications where multiple cycles of passage of flux through the auger feeder occur with multiple comminution of the flux, the prior art apparatus cannot maintain the preset flux backing thickness at a constant level. The flux backing thickness decreases because of comminution of flux and associated reduction of its particle size as the weld length, hence number of recycles of flux increases. In addition, in welding with such an apparatus of long welds with a varying welding speed, the flux backing thickness varies upon variation of the welding speed.

Such changes in the flux backing thickness result in fluctuations of preset flux pressures at various points along the joint being welded during welding, impair welding quality and disrupt the process as a whole.

In such cases, welding should be interrupted, and the apparatus stopped. The comminuted (pulverulent) flux should be replaced with fresh flux having an optimum grading composition. After replacement of the flux, the end crater of the weld should be repaired, and only after that can welding of the long joint continue. Quality of welding of such joints is impaired because of stoppages, repaired portions and other defects.

In addition, this apparatus does not allow a preset flux backing thickness to be set up or varied if necessary in welding long joints (e.g. in welding structures with different thicknesses of plates along one and the same joint, e.g. in the manufacture of railway tanks and other products), nor does it allow flux to be rapidly replaced by another grade or type of flux (fine-grained, ceramic, and the like) during welding at a constant or varying welding speed and with the employment of an arc auger drive (constant speed motors which are generally used under heavy-duty industrial operating conditions).

On the other hand, when a d-c drive is used for driving auger in this apparatus (with a speed control), the flux backing height can be controlled during welding of long joints. This control in the prior art apparatus can, however, be only affected by way of visual monitoring with measurement of the actual thickness of the flux backing during welding at regular intervals, comparison thereof with a preset value and manual variation of the auger speed, e.g. by means of potentiometers in the d-c motor control circuit in the auger rotation drive so as to maintain the preset thickness of the flux backing. This adjustment and maintenance of the flux backing thickness cannot ensure a guaranteed quality in producing overhead welds since operation depends on skill and experience of the operator and calls for a permanent involvement of the operator in welding process.

Overhead submerged-arc welding process becomes more difficult, and quality of welded joints is impaired in all such cases.

Therefore, in order to enhance and facilitate welding process in welding at a constant and varying speed in carrying out the overhead submerged-arc welding and to ensure the production of high-quality welds of a constant quality along the entire joint being welded, it is necessary to carry out automatically an increase in flux supply to the welding zone (to the bowl) upon every close-loop cycle of the flux movement, and flux supply to the bowl should also be changed upon every change in welding speed so as to ensure a constant flux supply rate to the welding zone.

This operation with a constant flux supply rate to the bowl ensures the maintenance of a constant preset flux backing thickness necessary for a high-quality overhead welding in welding long joints at a constant or varying speed.

SUMMARY OF THE INVENTION

The main object of the present invention is to provide an apparatus for overhead submerged-arc welding, the construction of which, and control of a driven auger feeder to supply and press the flux in the welding zone with the formation of a flux backing during welding of long weld with a preset constant or varying speed of welding, would automatically ensure improvement in the quality of welding joints due to stabilization of preset flux pressures in the electrode zone and at the crystallization portions of the welding zone by control line and by maintaining a constant during welding of elongated joints at a preset thickness of a flux backing.

The above object is accomplished by an apparatus for overhead submerged-arc welding, comprising a pivotally mounted hopper containing flux supported by a pivot pin and having a bowl which has its open part facing towards a work being welded and communicates with a driven auger feeder for supplying flux and pressing it against a work being welded to form a flux backing, a welding nozzle for supplying a consumable electrode extending through the bowl, and a forming means provided adjacent to the welding nozzle above the brim of the open part of the bowl and mounted on a suspension for swinging in its own longitudinal and transverse planes, according to the invention, is provided with a flux backing thickness pickup connected to a controlled drive of the auger feeder for varying the number of revolutions of the auger of the driven auger feeder during a preset time period.

This construction of the apparatus for overhead submerged-arc welding with the provision of the flux backing thickness pickup connected to the controlled drive of the auger feeder for varying the number of revolutions of the auger of the driven auger feeder during a preset time period makes it possible to automatically control and keep constant, during overhead welding of long joints at a constant or varying speed, the preset flux backing thickness by controlling the driven auger feeder for supplying flux to the welding zone (to the bowl) and for pressing it against the work in such a manner that its amount supplied to the bowl remain unchanged, thereby enhancing quality of welded joints owing to stabilization of preset flux pressures in the electrode zone and in the areas of solidification of the welding bath.

The flux backing thickness pickup is preferably mounted on a front edge of the bowl in the welding direction, adjacent to its longitudinal axis, and comprises an eddy current transducer.

This construction, in which the flux backing thickness pickup is provided on the front edge of the bowl in the welding direction, adjacent to its longitudinal axis, and comprises an eddy current transducer, allows monitoring and maintenance at a stable level of the preset flux backing thickness during overhead submerged-arc welding of long joints using a non-contact technique to be carried out and enhances high quality of overhead welds as a whole. As flux is being comminuted i.e. after every next close-loop flux movement cycle, its supply to the bowl increases which is effected by controlling operation of the electric motor of the controlled auger feeder drive. This electric motor, depending on commercial operating conditions, may be an induction motor (with a constant speed) or a d-c motor (with a speed control). An induction motor having a supply frequency control (with speed control) may also be used.

Operation mode of a chosen electric motor of the controlled drive of the auger feeder is determined and calculated preliminarily before welding in accordance with specific welding conditions (process conditions, fluxes used and their grading composition, weld length and other conditions).

The possibility of controlling and maintaining at a constant level of a present flux backing thickness during welding at a constant or varying speed along the whole length of a joint being welded is necessary both for correcting welding parameters and in welding with the employment of different flux grades replaced either before or during welding.

Therefore, the apparatus according to the invention facilitates overhead submerged-arc welding and guarantees quality of welded joints in welding at a constant as well as at a varying welding speed so that a universal apparatus for overhead submerged-arc welding can be provided which allows quality of overhead welds to be enhanced as a whole.

BRIEF DESCRIPTION OF THE DRAWING

The invention will now be described in detail with reference to a specific embodiment illustrated in the accompanying drawing which schematically shows an apparatus for overhead submerged-arc welding in a longitudinal section, according to the invention.

DESCRIPTION OF THE PREFERRED EMBODIMENT

The reference is now made to the accompanying drawing which shows a specific embodiment of an apparatus for overhead submerged-arc welding according to the invention.

An apparatus for overhead submerged-arc welding comprises a hopper 1 containing flux 2.

The hopper 1 accommodates a driven auger feeder for supplying flux 2 to a bowl 3 and for pressing it against a work, the bowl being mounted in the top part of the hopper 1 and having its open part facing towards a work 4 being welded. The bowl 3 is connected to a supply pipe 5 of the auger feeder which houses an auger 6 connected, by means of bevel gears 7, 8, to a controlled drive 9 for supplying flux 2 to the bowl 3 and for pressing it against the work.

The drive 9 may have an electric motor either of the induction motor type (with a constant speed), such motors being preferably used under heavy-duty industrial operating conditions, or a d-c electric motor (with speed control) for use under lighter operating conditions.

An induction motor with supply frequency control (or speed control) can also be used.

The pipe 5 accommodating the auger 6 and the controlled drive form an auger feeder.

Flux 2 is supplied from the hopper 1 to the joint being welded in the following manner.

During rotation of the auger 6 by means of the controlled drive 9, flux 2 is admitted through a port 10 in the lower part of the pipe 5 communicating the hopper 1 with the driven auger feeder through the supply pipe 5, to the bowl 3.

The bowl 3 is designed for providing a flux backing and for exerting through the intermediary thereof a local pressure in the area extending along the joint being welded upstream of the arc with respect to a finished weld 11 as well as along the welding bath on the underside of the work 4 being welded.

The hopper 1 is provided with a welding head 12 having a welding nozzle 13 for supplying a consumable electrode 14, e.g. from a coil 15 of electrode wire by means of a supply means of the welding head 12.

The nozzle 13 is mounted in the hopper 2 in such a manner as to extend through the bowl 3, and its end received in the bowl 3 is offset with respect to the supply pipe 5.

This offset position of the welding nozzle 13 with respect to the supply pipe 5 of the auger feeder is caused by the fact that there is a non-uniform distribution of pressure exerted by flux 2 upon the work 4 being welded in the zone of flux supply from the hopper 1 to the bowl 3. At the same time, to ensure stability of parameters of the overhead submerged-arc welding, it is necessary to provide for uniform pressure, and distribution of pressure of flux 2 in the arc zone and adjacent to the electrode 14.

This uniform distribution of pressure of flux 2 in the vicinity to the electrode 14 is achieved by the fact that the flux backing is pressed against the work 4 being welded with a constant preset pressure, and uniform distribution of this pressure in the welding zone occurs owing to friction forces built up during relative movement of the work 4 being welded and the apparatus for overhead submerged-arc welding.

Surplus flux 2 that does not take part in welding overflows through the bowl 3 and spills freely back into the hopper 1 to flow towards the port 10.

Circulation of flux 2 from the hopper 1 to the welding spot thus occurs with recycling so as to enhance cost-effectiveness of welding.

A forming means 16 is provided adjacent to the welding nozzle 13 in a spaced position in relation to the consumable electrode 14.

The forming means 16 is in the form of a bar made of a heat-resistant heat conducting material and having a profile of its face cooperating with the flux backing and the work 4 being welded ensuring the creation of necessary pressures in the welding zone and formation of the finished weld 11. This bar may be cooled with, e.g. air or water.

For producing welded joints with a preset configuration of weld reinforcement on the underside of the work, the forming means 16 may be, e.g. in the form of a slider. The slider is mounted for a direct engagement with the weld being formed. The provision of the forming means 16 in the form of a slider enhances quality of the surface of the finished weld 11.

Configuration and profile of the contact surface of the forming means 16 engageable with the work during welding are chosen mainly in accordance with the joint type, desired configuration and dimensions of the finished weld, grade and type of fluxes used and parameters of welding.

The pivotally mounted hopper 1 containing flux 2 is supported by a pivot pin 17 which also supports a copying wheel 18.

The pivot pin 17 supporting the hopper 1 and the copying wheel 18 is mounted on a mounting arm 19 of a carriage 20 which is installed on a guide rod 21.

The welding nozzle 13 extends through the bowl 3.

The forming means 16 is mounted above the brim of the open part of the bowl 3 on a suspension attached to a pivot pin 22 and is mounted on this suspension for cooperation with a rear wall of the bowl 3 and for oscillations in the longitudinal and transverse planes. The pivot pin 17 supporting the hopper 1 containing flux 2 and the copying wheel 18 should allow the hopper 1 to oscillate.

The pivot pin 22 for supporting the suspension of the forming means 16 should ensure oscillations of the suspension substantially in the plane of the joint being welded.

The suspension of the forming means 16 is made in the form of a double-arm lever 23. One end of the double arm lever 23 supports a pivot pin of the suspension of the forming means 16 which is in the form of a point-like abutment 24.

The forming means 16 is constructed and mounted on the abutment 24 of the suspension in such a manner as to enable its self-positioning with respect to the surface of the work 4 being welded.

The other arm of the double-arm lever 23 is connected to a power actuator 25 (e.g., an air or hydraulic cylinder). The power actuator 25 may also be in the form of spring means, weights, counterweights, and the like.

The power actuator 25 is pivotally attached to the mounting arm 19.

This construction of the suspension of the forming means 16 makes it possible to carry out especially smooth and accurate copying of the surface of the work 4 being welded by the forming means 16.

This suspension also compensates for friction forces developed during cooperation of the surface of the work 4 being welded with the forming means 16 so as to provide conditions for a stable maintenance of preset parameters of overhead submerged-arc welding.

A copying member, e.g. in the form of the copying wheel 18 is provided at the end of the mounting arm 19 and supported by the pivot pin 17. The copying wheel 18 is designed for ensuring a constant distance from the surface of the work 4 being welded to the pivot pin 17 supporting the hopper 1 containing flux 2 and to the pivot pin 22 supporting the suspension of the forming means 16.

This stability of the distance is necessary to stabilize pressures exerted by the flux backing upon the surface of the joint being welded so as to stabilize all parameters of the overhead submerged-arc welding.

The carriage 20 is adapted to move in the direction towards the work 4 being welded, and for that purpose, it is installed on an appropriate guide, e.g. in the form of a guide rod 21.

The carriage 20 is provided with a means for pressing the copying wheel 18 against the work 4 being welded, which is in the form of a power actuator 26 (e.g., air or hydraulic cylinder) for moving the carriage 20 in the direction towards the work 4 being welded.

The apparatus is provided with a means for turning the hopper 1 about its support pivot pin 17 to ensure necessary pressures of the flux backing upon the work 4 being welded.

The means for turning the hopper 1 about the pivot pin 17 supporting the hopper comprises a power actuator 27 (e.g., an air or hydraulic cylinder) pivotally connected to the hopper 1 and carriage 20.

The pivot pin 17 supporting the hopper 1 may be provided on the bowl of the hopper 1 in an offset position relative to the controlled driven auger feeder for supplying flux and for pressing it against the work being welded and for forming and maintaining the flux backing during the entire welding period.

In this case, it is preferred that the hopper 1 be connected on the opposite side to the means for turning the hopper 1 about its supporting pivot pin 17.

The power actuator 21 may have a different construction, e.g. it may be in the form of spring means or in the form of a weight attached to the hopper 1.

This construction of the hopper 1 allows a highly sensitive system to be provided which reacts to a change in profile of the surface of the work 4 being welded and automatically provides conditions for maintaining the necessary preset pressures of flux 2 in the welding zone.

Supporting the double-arm lever 23 of the suspension of the forming means 16 on the point-like abutment 24, the provision of the pivot pin 17 supporting the hopper 1 containing flux 2 and suspension of the lever 23 by means of the pivot pin 22 on the mounting arm 19 of the carriage 20, and operative connection of the carriage 20 through the mounting arm 19 and the copying wheel 18 with the work 4 being welded allow position of the double-arm lever 23 with respect to the work 4 being welded to be stabilized even upon deviations of configuration of the work from regular geometry or in welding structures of irregular configuration.

This stabilization of position of the double-arm lever 23 ensures constant angles of cooperation of the working face of the forming means with the surface of the work 4 being welded during welding thereby maintaining constant distributed flux pressures at various points along the joint being welded at the point of welding.

The apparatus according to the invention has a flux backing thickness pickup 28 connected to the controlled drive 9 of the auger feeder for varying the number of revolutions of the auger 6 of the driven auger feeder during a preset time period.

This construction allows the supply of an additional compensating amount of flux 2 fed to the bowl 3 in welding long welds where intensive comminution of flux during welding is especially remarkable so as to cause, e.g. in welding at a constant speed, a partial decrease in the flux backing thickness or, in welding at a varying speed, fluctuations of the flux backing thickness during welding to impair quality of weld formation because of fluctuations of flux pressure in the zone of the electrode. Stabilization of the preset thickness "a" of the flux backing desirable in the overhead submerged-arc welding is thereby ensured, the flux backing thickness thus becoming substantially independent of grading composition of flux 2 and its self-compaction in welding with constant or varying speed. When it is necessary to vary welding speed, e.g. in welding long joints, this facility enhances quality of welded joints, facilitates welding process and makes the apparatus versatile for overhead submerged-arc welding.

The flux backing thickness pickup 28 is mounted on the front edge of the bowl 3 in the welding direction, adjacent to its longitudinal axis and comprises an eddy current transducer.

This construction makes it possible to monitor and maintain the preset thickness of the flux backing with respect to the underside of the work 4 being welded in welding elongated joints and ensures high quality of overhead welds as a whole.

The flux backing thickness pickup 28 may be either of non-contact type as mentioned above or of a mechanical or contact type designed for a mechanical cooperation with the underside surface of the joint being welded depending on welding conditions and configuration of joints being welded (with V-section or without it, or with other special features).

The flux backing thickness pickup 28 may be in the form of mechanical feeler gauges, wheels and other members of conventional type or other members cooperating with a double-action limit switch with a variable stroke for sensing the flux backing thickness "a" taking into account its tolerances during welding.

The non-contact flux backing thickness pickup 28 may be in the form of conventional eddy current transducers, electromagnetic inductive transducers and the like adjusted for a preset mode of operation before welding.

The flux backing thickness pickup 28 is connected to a control circuit of the electric motor of the drive 9 of the auger feeder in such a manner that control and maintenance of the preset flux, backing thickness "a" should be carried out during welding at a constant or varying speed by controlling and varying the number of revolutions of the auger 6 of the driven auger feeder during a preset time period.

The control of the amount of flux 2 supplied to the bowl 3 is thereby provided during welding at a constant or varying welding speed necessary for stabilizing the preset flux backing thickness in accordance with a command from the flux backing thickness pickup 28, the provision of which in the form of an eddy current transducer is preferable among all other types of pickups known in the art of thickness pickups.

For moving the apparatus in the welding direction, it has a driven trolley 29 to which is rigidly attached the guide rod 21 for movement of the carriage 20 and to which the power actuator 26 for moving the carriage 20 is pivotally attached. The driven trolley 29 has its own drive 30 and moves in the welding direction along a track 31.

The driven trolley 29 is necessary for moving the apparatus along the joint being welded.

The driven trolley 29 is designed for moving the whole apparatus along the weld being produced which is necessary for welding elongated joints of difficult-to-position planar and three-dimensional sections or large-area plate structures and other products, especially in carrying out the overhead welding.

The advantages of the abovedescribed apparatus are especially remarkable in producing elongated penetration, sealing and one-pass overhead welds.

The abovedescribed apparatus for overhead submerged-arc welding functions in the following manner.

Flux 2 is loaded in the hopper 1 before welding. Grading composition of flux 2 does not require preliminary sorting and check up by screening or by any other method and should comply with the type and grades of fluxes being used.

Composition of flux 2 used for overhead submerged-arc welding is chosen mainly in accordance with the material of the work being welded, configuration of joints and welding conditions.

Flux 2 used for welding consists of $SiO_2$, MnO, CaO, MgO, $Al_2O_3$, $CaF_2$ and other components ensuring stable arcing, fusion of the material of the work 4 being welded, protection of the welding bath, and formation of the finished weld 11.

The apparatus for overhead submerged-arc welding is placed under the work 4 being welded before welding. There are two options in doing this.

In welding elongated straight joints of large-size structures, the apparatus is generally moved along the joint being welded.

In producing annular welds of rotatable structures, the apparatus remains stationary during welding, and the work 4 is caused to rotate about its own axis so that the joint being welded be located in the zone of the electrode 14.

With the apparatus being placed under the work 4 being welded, the power actuator 26 of the carriage 20 adjusted for welding of a given structure is switched on, and the power actuator presses the copying wheel 18 mounted on the pivot pin 17 through the intermediary of the carriage 20 mounted on the guide rod 21 and mounting arm 19 against the underside of the work 4 being welded. The pivot pin 17 also supports the hopper 1.

This pressure of the copying wheel 18 against the work is carried out during the entire welding of the joint. The copying wheel 18 is in permanent contact with the underside of the work 4 being welded.

Then the power actuators 25 of the suspension of the forming means 16 and 27 of rotation of the hopper 1 which are also adjusted for welding a given structure are simultaneously switched on.

The forming means 16 is pressed against, and then self-positioned with respect to the underside of the joint being welded, and the open part of the bowl 3 facing towards the work is pressed against the work 4 being welded.

This pressure of the forming means 16 against the work by means of the double-arm lever 23 supported by the pivot pin 22 continues until the top working face thereof comes in touch with the outer surface of the work 4 being welded and the forming means 16 is self-positioned with respect to this surface of the joint being welded.

During this self-positioning of the forming means 16 mounted on the abutment 24 of the double-arm lever 23, the lever oscillates in the longitudinal and transverse planes of the forming means under the influence of geometry and configuration of the joint being welded.

At the same time, the bowl 3 is positioned with respect to the underside of the work 4. This positioning of the bowl 3 is carried out under the action of the power actuator 27 by turning the bowl about the pivot pin 17 supporting the hopper 1, which is mounted on the mounting arm 19.

Then the drive 9, also adjusted for welding a given type of the work 4, is switched on to rotate, via the bevel gears 7 and 8, the auger 6.

As a result of rotation of the auger 6, flux 2 is supplied through the port 10 in the bottom part of the pipe 5 and through the pipe 5, to the bowl 3. Flux 2 supplied to the bowl 3 acts upon the surfaces of the joint being welded at the welding point to form a flux backing.

Then the drive 30 of the trolley 29 is switched on (this drive 30 is switched on in welding elongated joints, and in welding annular joints the drive 30 is not switched on, and a rotary drive for rotating the work is switched on, which is not shown in the drawing) and the trolley moves along the track 31.

Then voltage is applied to the consumable electrode 14, and the supply means of the welding head 12 is switched on to supply the electrode 14 from the coil 15 through the nozzle 13 to the joint being welded.

The joint can be welded with either constant or varying welding speed.

The finished weld 11 is formed.

The accompanying drawing shows an embodiment of overhead welding of an annular joint when the apparatus for overhead submerged-arc welding is stationary. The longitudinal joint is shown for the sake of simplicity.

During overhead welding of elongated joints at a constant or varying welding speed, the flux backing thickness pickup 28 carries out monitoring of the preset flux backing thickness and, owing to its coupling to the controlled drive of the auger feeder, automatically varies (lowers or raises) the number of revolutions of the auger 6 of the driven auger feeder during a preset time period.

After the welding, the welding process is interrupted by consecutively switching off the welding head 12, drive 30 actuators 9, 25, 27 and 26, and the apparatus is retracted from the work.

The flux backing thickness in the abovedescribed apparatus for overhead submerged-arc welding is kept constant and, owing to this, preset flux pressures in the electrode area and at points of solidification of the welding bath are kept stable, hence, high quality can be ensured in carrying out overhead welding with any length of joints being welded and with both constant and varying welding speed as well as with the employment of different welding materials (fluxes and electrode wire).

The finished welds produced by the abovedescribed apparatus feature high quality, comply with preset dimensional specifications and have smooth transitions between the weld and base metal while exhibiting good external appearance.

Therefore, the apparatus for overhead submerged-arc welding according to the invention allows overhead submerged-arc welding to be carried out at both constant and varying welding speed with maintenance of a constant flux backing thickness which is necessary for producing high-quality overhead welds in welding structures with a wide range of profiles of component members. The apparatus makes it possible to carry out automatic welding and substantially eliminates operator's involvement in the welding process.

To the most advantage the apparatus for overhead submerged arc welding according to the present invention can be used for welding, at both constant and varying speeds, elongated annular and longitudinal back-up root and single-pass overhead welds, when it is necessary to obtain a high quality of welded joints taking into account increased requirements to quality of surface formation at both sides of a weld (for example, annular joints of casings boilers, pipelines, vessels, tanks or elongated longitudinal welds of large size planer and three-dimensional sections, widths, segments and other welded constructions).

We claim:

1. An apparatus for overhead submerged-arc welding, comprising: a pivotally mounted hopper containing flux supported by a pivot pin and having a bowl which has an open part facing towards a work being welded and communicates with a driven auger feeder for supplying and pressing the flux to form a flux backing, a welding nozzle for supplying a consumable electrode extending through the bowl and a forming means provided adjacent to the welding nozzle above the brim of the open part of the bowl and mounted on a suspension for swinging in longitudinal and transverse planes, said apparatus further comprising a flux backing thickness pickup connected to a controlled drive of the auger feeder for varying the number of revolutions of the auger of the driven auger feeder during a preset time period.

2. An apparatus according to claim 1, wherein the flux backing thickness pickup is mounted on a front edge of the bowl in the welding direction, adjacent to the longitudinal axis thereof and comprises an eddy current transducer.

* * * * *